No. 866,626. PATENTED SEPT. 24, 1907.
A. J. COOK.
APPARATUS FOR SEPARATING FINELY DIVIDED MATERIAL.
APPLICATION FILED APR. 4, 1907.
2 SHEETS—SHEET 1.
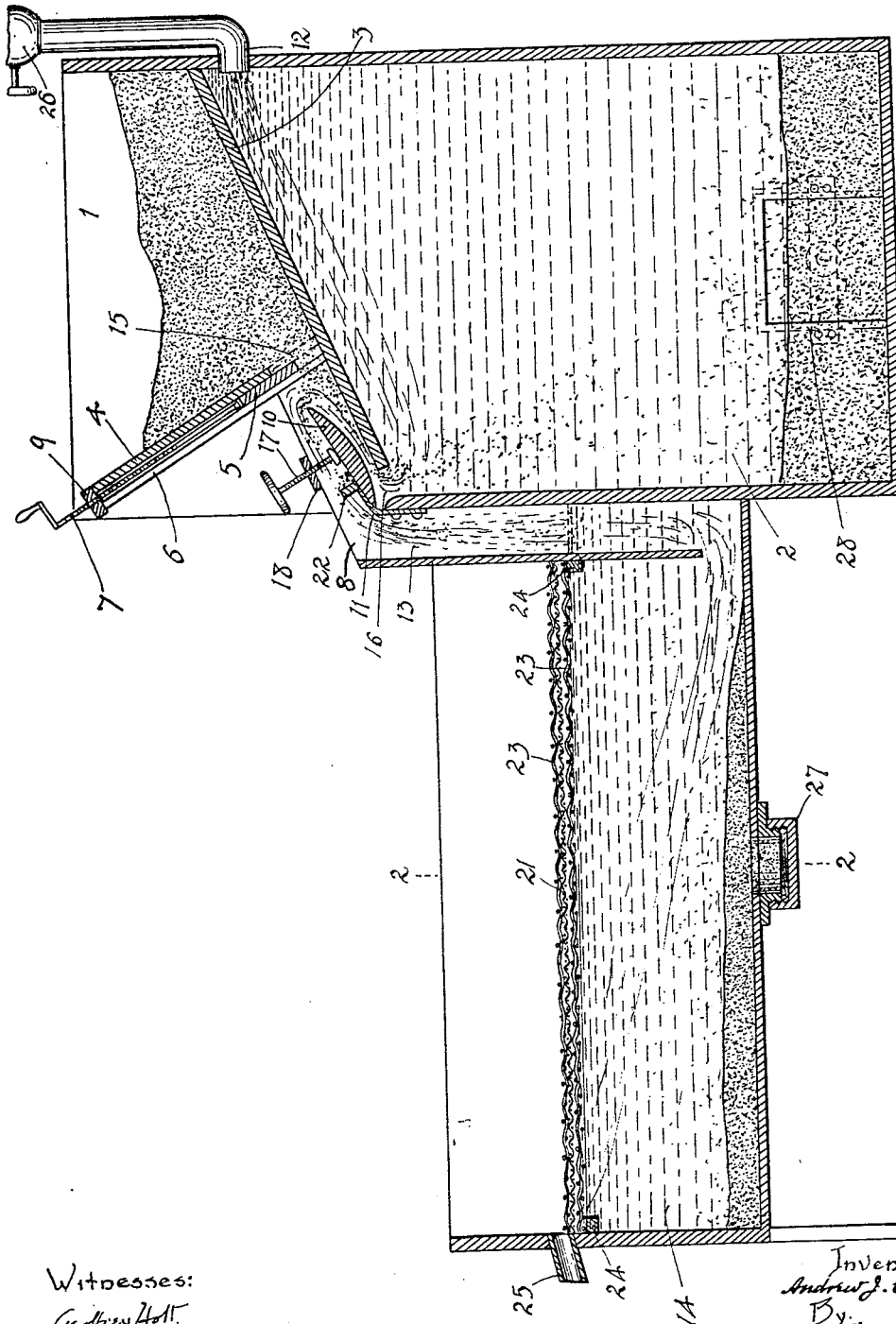

No. 866,626.
PATENTED SEPT. 24, 1907.
A. J. COOK.
APPARATUS FOR SEPARATING FINELY DIVIDED MATERIAL.
APPLICATION FILED APR. 4, 1907.
2 SHEETS—SHEET 2.
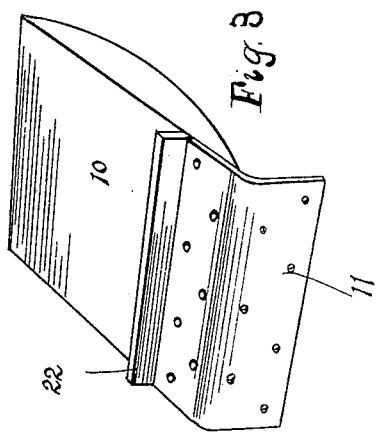
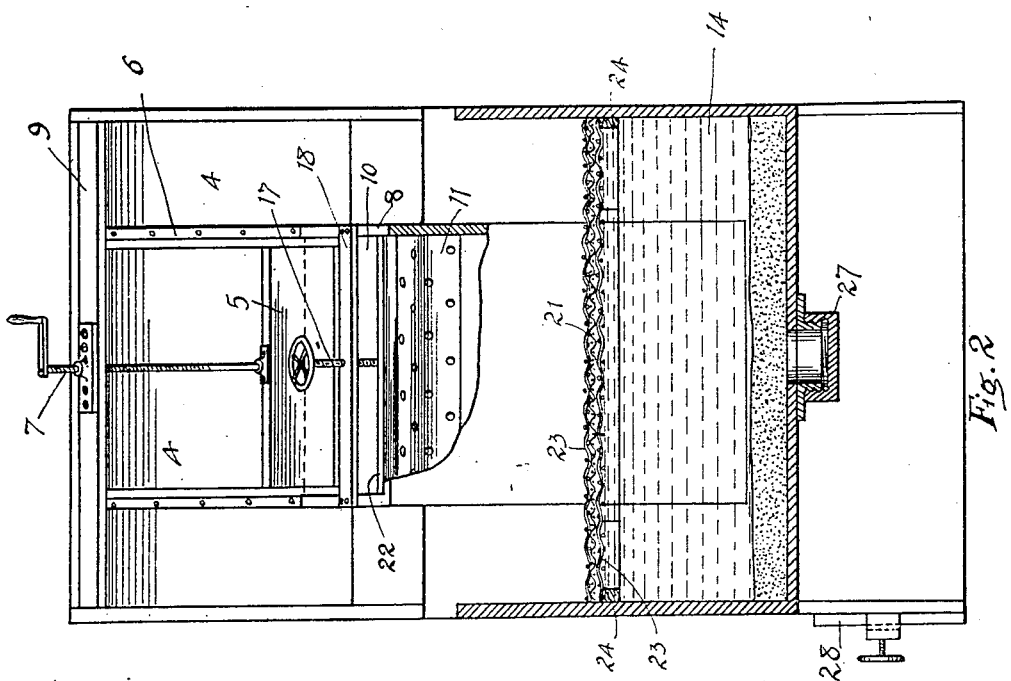

UNITED STATES PATENT OFFICE.

ANDREW J. COOK, OF SAN RAFAEL, CALIFORNIA.

APPARATUS FOR SEPARATING FINELY-DIVIDED MATERIAL.

No. 866,626.  Specification of Letters Patent.  Patented Sept. 24, 1907.

Application filed April 4, 1907. Serial No. 366,258.

*To all whom it may concern:*

Be it known that I, ANDREW J. COOK, a citizen of the United States, residing at San Rafael, in the county of Marin and State of California, have invented new and useful Improvements in Apparatus for Separating Finely-Divided Material, of which the following is a specification.

This invention relates to an apparatus for separating mineral substances of different specific gravity the object of the invention being to provide such an apparatus as will permit of a very delicate separation of such substances, according to their respective gravities, and which will permit of the same being accurately adjusted so as to vary at will, the magnitude of the specific gravity at which such separation takes place.

The invention is particularly adapted to the separation of what is known as "black sand" from ordinary particles of silicious matter, or of particles of gold, silver, platinum, tin, or the like from sand, or other particles of less specific gravity.

In the accompanying drawings, Figure 1 is a vertical longitudinal section of the appartaus; Fig. 2 is a section on the line 2—2 of Fig. 1; Fig. 3 is a perspective view of the shoe.

Referring to the drawings, 1 indicates a hopper into which, by any suitable means, is fed the material to be treated. For the more perfect and efficient operation of the apparatus, the material should have been brought to a granular form, either naturally or by subjecting the same to crushing processes, and should also have been reduced to substantial uniformity of the grains thereof, by passing the same through suitable screens. The bottom 3 of said hopper preferably forms likewise the top of the receptacle 2 for the heavier particles, and slopes downward toward the discharge opening 15 of the hopper, which discharges between parallel side walls 8 of a sluice channel or conduit. Said opening 15 is adjusted as to its height by means of gate 5, which slides in grooves formed by means of cleats 6 on said channel walls 8. The gate is raised or lowered to vary the size of said opening by means of a screw 7, attached to the upper edge of the gate and screwed through a plate 9 attached to said front wall at its upper edge and having a suitable handle for turning the same. The adjustability of the discharge opening from the hopper forms an important feature of the apparatus. Extending between said sluice walls 8 is a shoe or partition 10 the lower or front edge of which is hinged by means of any suitable flexible material 11 to the front wall of the receptacle 2, and an opening 16 is formed in the sloping top 3 beneath the front end of said shoe. Water under pressure is admitted to the receptacle 2 by means of a pipe 12 controlled by a valve 26, and, when said receptacle has been filled with water, the water flows upward through the opening 16, and impinges against the under side of the shoe, raising the same. It then flows between the under side of said shoe and the upper surface of the sloping top 3, and is thus compelled to escape in a direction substantially opposite to that of the egress of the granular material from the hopper through the discharge opening 15. The water flows over the top of the shoe 10, between the walls of the sluice channel. The result of the opposing forces, of the pressure of the water discharged upward toward the opening 15, and the weight of the granular material descending through said opening 15 is to momentarily arrest the water to separate the particles of granular material, the heavier particles, by reason of their greater specific gravity, overcoming the upward flow of the water, and passing down through the stream of water into the receptacle 2, while the lighter particles are carried therewith over the top of the shoe. They are thus carried with the water into a spout 13, which descends nearly to the bottom of a second receptacle 14.

The upward movement of the shoe is limited by means of a screw 17, which is screwed through a bar 18, extending across the channel, and it is by means of this screw that the apparatus is very exactly adjusted, so that for any given size of the opening 15, the separation of the granular material may take place above and below any specific gravity desired. For it is evident that by screwing down the screw 17, so as to contract the opening beneath the shoe for the passage of the water, the velocity of the outgoing water is thereby increased, and, in consequence, the minimum specific gravity of the granular material able to descend through said outgoing water is raised.

For the purpose of enabling the operator to determine precisely the specific gravity of the particles which are being collected in the receptacle 2, there is provided, on the top of the shoe 10, but spaced from the upper edge thereof to form a pocket, a wall or riffle 22, the function of which is to arrest the heaviest of the particles which have been unable to descend below the shoe. By examination, from time to time, of these particles so retained, the operator can determine with great nicety the specific gravity at which the particles separate, those of the higher specific gravity going to the receptacle 2, and those of the lower into receptacle 14. Thus if it is desired to make a change in the densities of the particles collected in the respective receptacles, the screw 17 will be turned to contract or expand the opening for the water, as may be desired.

The top of the receptacle 14, into which the water and the mineral matter of the lightest specific gravity pass, is covered by a sheet 21 of filtering material inclosed between two strong wire screens 23, which hold said filtering sheet in place, said screens resting upon ledges 24. By means of this filtering screen the solid particles are retained within the receptacle, while the water escapes through the screen and passes out by a discharge spout 25.

The heavy and light material may be removed from the respective receptacles from time to time by openings 27, 28, having suitable closures.

It is to be understood that the apparatus is not limited to the precise details of construction herein described, but that the same may be changed or modified in many ways without departing from the spirit and scope of my invention.

I claim:—

1. An apparatus of the character described, comprising a sloping conduit having parallel side walls, a movable partition extending completely across said conduit between said side walls, means for feeding finely divided material downwards in said conduit from a point above the upper edge of said partition, means for impelling liquid upwards in said conduit beneath said partition, means for adjustably limiting the distance of said partition from the bottom of said conduit, and a riffle on the upper side of said partition extending between the walls of the conduit and spaced from the upper edge of the partition to form therewith a pocket to catch the heavier solid particles which escape over said front edge, substantially as described.

2. An apparatus of the character described, comprising a receptacle having a sloping top and a passage therethrough, walls on said top forming a channel, means for feeding finely divided material into said channel at its top, a partition in said channel extending upwards therein between said walls towards said feeding means, said separator comprising a shoe, a wall or riffle on said shoe, spaced from the upper edge thereof to form a pocket flexible material secured to the front end of the shoe and to the wall of said receptacle and means for supplying water under pressure to said receptacle, substantially as described.

In testimony whereof I have hereunto set my hand in the presence of two subscribing witnesses.

ANDREW J. COOK.

Witnesses:
C. L. HOWE,
D. B. RICHARDS.